UNITED STATES PATENT OFFICE 2,235,471

AMINO - O - HYDROXY-CARBOXYLIC ACIDS OF THE DIARYLMETHANE SERIES

Jakob Bindler, Basel, Switzerland, assignor to J. R. Geigy A. G., Basel, Switzerland No Drawing. Application June 13, 1939, Serial No. 278,955. In Switzerland June 14, 1938

7 Claims. (Cl. 260—519)

This invention relates to the manufacture of amino-o-hydroxy-carboxylic acids of the diarylmethane series useful in industry, for example for imparting softness to textile materials treated therewith.

According to the invention the amino-o-hydroxy-carboxylic acids of the diarylmethane series concerned are produced by causing halogenmethyl substitution products of aromatic o-hydroxy-carboxylic acids or similarly reacting derivatives or aromatic o-hydroxy-carboxylic acids to react with aromatic amines capable of reacting, and which contain at least one aliphatic or alicyclic radical with more than 6 carbon atoms. As halogen-methyl substitution products of aromatic o-hydroxy-carboxylic acids may be mentioned particularly the compounds described in German Patents 236,046 and 454,460, such as p-chloromethyl-o-cresotinic acid, the corresponding p-hydroxymethyl and anhydro compounds, as well as the corresponding derivatives of other aromatic o-hydroxy-carboxylic acids, as for example of salicylic acids, chlorosalicylic acid, methylenedisalicylic acid, amino-arylmethylenesalicylic acid (for example aminodiphenylmethane-o-hydroxy-carboxylic acids) and hydroxynaphthoic acids. When the o-hydroxycarboxylic acid or its derivative is capable of substitution a number of times by the halogenmethyl group, as for example salicylic acid or methylenedisalicylic acid, these poly-halogenmethyl compounds may also be used for condensation, whilst it may be mentioned that also different bases may be used at the time or one after the other for reaction.

The aromatic amines capable of reaction which are used for condensation, are subject to the sole condition that they must contain a high molecular aliphatic or alicyclic radical, which may be located at a suitable position, for example at the nitrogen or at its substituents, for example directly in the existing nuclei or in the nuclear substituents. There may be mentioned primary, secondary and tertiary amines of aromatic nature, whilst the term aromatic also includes heterocyclic compounds with cyclically linked nitrogen.

The following example illustrates the invention, the parts being by weight:

74 parts of ethyl-octodecylaniline are dissolved in 300 parts of a solvent, such as chlorobenzene, and 38 parts of chloromethylenesalicylic acid 98% are added. The mixture is heated for 24 hours up to 100–120° C. and after the condensation has been completed the chlorobenzene is driven off with steam. The distillation residue is dissolved neutral in dilute lye, the solution allowed to cool, and the sodium salt of the carboxylic acid formed is precipitated with 15% cooking salt, filtered off and dried. The final product is a wax-like mass soluble in water.

By replacing the above mentioned amine by other suitable amines it is possible to produce a large series of similar compounds. In the following table there is set out a series of reaction components with the parts by weight used, capable of being condensed according to the above process.

Instead of ethyl-dodecylaniline there may also be used octo-decyl-p-toluidine.

Table

| No. | Parts | Chloromethyl derivative of the hydroxy-arylcarboxylic acid or functional derivative | Parts | Amine |
|---|---|---|---|---|
| 1 | 36 | p-Hydroxymethyl-o-cresotinic acid | 74 | Ethyl-octodecylaniline. |
| 2 | 44 | o-Chloromethyl-p-cresotinic acid | 74 | Do. |
| 3 | 25 | o:p-Di(chloromethyl)-salicylic acid | 74 | Do. |
| 4 | 44 | p-Chloromethyl-salicylic acid | 74 | Octodecylaniline. |
| 5 | 25 | o:p-Di(chloromethyl)-salicylic acid | 74 | Do. |
| 6 | 42 | p-Chloromethyl-o-cresotinic acid | 76 | Octodecylanthranilic acid. |
| 7 | 25 | o:p-Di(chloromethyl)-salicylic acid | 76 | Do. |
| 8 | 22 | Chloromethyl-salicylic acid | 43 | as-Diethyl-stearoyl-p-phenylenediamine. |
| 9 | 12.5 | o:p-Di(chloromethyl)-salicylic acid | 43 | Do. |
| 10 | 20 | Chloromethyl-salicylic acid | 41 | as-Diethyl-octodecyl-p-phenylene-diamine. |
| 11 | 20 | do | 38 | p-Dimethylamino-benzyl-N-stearoylamine. |
| 12 | 25 | o:p-Di(chloromethyl)-salicylic acid | 76 | Do. |
| 13 | 20 | Chloromethylsalicylic acid | 44 | p - Diethylamino - benzyl - N - stearoyl amine. |
| 14 | 20 | do | 51 | p - Ethyl - benzyl - amino - benzyl - N - stearoylamine. |
| 15 | 20 | do | 38 | p-Dimethylamino-stearophenone. |
| 16 | 20 | do | 35 | 2-heptadecylindole. |
| 17 | 25 | o:p-Di(chloromethyl)-salicylic acid | 70 | Do. |
| 18 | 25 | do | 70 | 2-heptadecyl-2:3-dihydroindole. |
| 19 | 20 | Chloromethyl-salicylic acid | 35 | 2-heptadecyl-benzimidazol. |
| 20 | 12.5 | do | 33 | N - heptadecyl - N - phenyl - N' - p -dimethyl-amino-phenyl urea. |
| 21 | 22 | do | 33 | N - dodecyl - p - dimethyl - amino - benzoylamine. |

In addition to the above mentioned amines with a high molecular residue there may also be used any desired suitable high molecular substituted amine capable of reaction. There may also be mentioned by way of example correspondingly substituted N-alkylimidazols, N-alkylindoles, and nuclear alkylated anilines as for example cetylaniline.

The o:p-di(chloromethyl)-salicylic acid mentioned in the above table may be produced easily as now indicated: 207 g. of salicylic acid are stirred into a mixture of 2,000 parts by volume of concentrated hydrochloric acid and 320 g. of formaldehyde of 28 per cent strength for 24 hours at 50° C. The product is then filtered, washed with a little ice water and dried in air. The reaction product is obtained as a snow white powder. In a similar manner the other chloromethyl derivatives of aromatic hydroxy-carboxylic acid compounds which contain more than one chloromethyl group can also be produced.

The new condensation products form, as alkali salts, light powders or salve-like masses which are soluble in water. They exhibit strong substantive properties, and impart to the textiles treated, for example artificial silks of all kind, a soft fleece-like feel, and possess the great advantage of being adapted to be used simultaneously with substantive dyestuffs in the dyeing bath.

What I claim is:

1. Amino-hydroxy-carboxylic acids of the diarylmethane series of the following general formula:

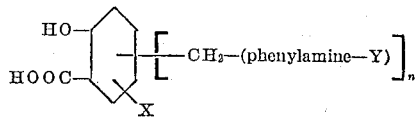

wherein X means a member of the group consisting of H and $CH_3$, Y means a substituent of the phenylamine selected from the group consisting of aliphatic and alicyclic radicals with more than 6 carbon atoms and $n$ means one of 1 and 2, being only 2 if X equals hydrogen, the —$CH_2$— groupings being linked in at least one of the positions ortho and para to the hydroxy group of one benzene nucleus and in one of positions ortho and para to the amino group of the other benzene nucleus.

2. Amino-hydroxy-carboxylic acids of the diarylmethane series of the following general formula:

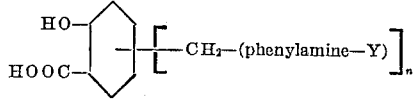

wherein Y means a substituent of the phenylamine selected from the group consisting of aliphatic and alicyclic radicals with more than 6 carbon atoms and $n$ means one of 1 and 2, the —$CH_2$— groupings being linked in at least one of the positions ortho and para to the hydroxy group of one benzene nucleus and in one of positions ortho and para to the amino group of the other benzene nucleus.

3. Amino-hydroxy-carboxylic acids of the diarylmethane series of the following general formula:

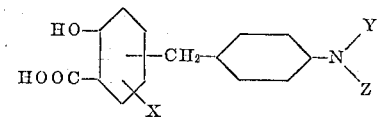

wherein X means a member of the group consisting of H and $CH_3$, Y means a substituent of the phenylamine selected from the group consisting of aliphatic and alicyclic radicals with more than 6 carbon atoms and Z means one of H and alkyl.

4. Amino-hydroxy-carboxylic acids of the diarylmethane series of the following general formula:

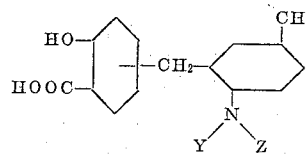

wherein Y means a substituent of the phenylamine selected from the group consisting of aliphatic and alicyclic radicals with more than 6 carbon atoms and Z means one of H and alkyl.

5. The amino-hydroxy-carboxylic acid of the formula:

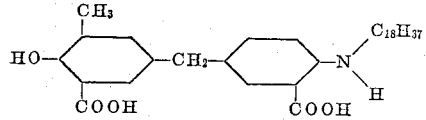

6. The amino-hydroxy-carboxylic acid of the formula:

HO—⟨⟩—$CH_2$—⟨⟩—N($C_{18}H_{37}$)($C_2H_5$)
         |
         COOH

7. The amino-hydroxy-carboxylic acid of the formula:

HO—⟨⟩—$CH_2$—⟨⟩($CH_3$)—NH($C_{18}H_{37}$)
         |
         COOH

JAKOB BINDLER.